United States Patent
Ghiondea et al.

(10) Patent No.: US 11,431,727 B2
(45) Date of Patent: Aug. 30, 2022

(54) SECURITY OF CODE BETWEEN CODE GENERATOR AND COMPILER

(71) Applicant: Microsoft Technology Licensing, LLC, Redmond, WA (US)

(72) Inventors: Gabriel Alexandru Ghiondea, Redmond, WA (US); Morgan Asher Brown, Redmond, WA (US); Jeremy Scott Barton, Seattle, WA (US); Barry Dorrans, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1151 days.

(21) Appl. No.: 15/449,876

(22) Filed: Mar. 3, 2017

(65) Prior Publication Data
US 2018/0255069 A1    Sep. 6, 2018

(51) Int. Cl.
*G06F 21/44* (2013.01)
*H04L 9/32* (2006.01)
*H04L 9/40* (2022.01)

(52) U.S. Cl.
CPC .......... *H04L 63/123* (2013.01); *H04L 9/3242* (2013.01); *H04L 9/3249* (2013.01)

(58) Field of Classification Search
CPC ... H04L 63/123; H04L 9/3249; H04L 9/3242; G06F 11/1004; G06F 16/178; G06F 16/152; G06F 16/184; G06F 16/2365
See application file for complete search history.

(56) References Cited

U.S. PATENT DOCUMENTS

| | | | |
|---|---|---|---|
| 6,463,538 B1 | 10/2002 | Elteto | |
| 6,647,301 B1 * | 11/2003 | Sederlund | .......... G05B 19/0428 700/108 |
| 6,880,149 B2 | 4/2005 | Cronce | |
| 7,080,257 B1 | 7/2006 | Jakubowski et al. | |
| 7,757,097 B2 | 7/2010 | Atallah et al. | |
| 2003/0135842 A1 | 7/2003 | Frey et al. | |

(Continued)

FOREIGN PATENT DOCUMENTS

| WO | 2013063376 A1 | 5/2013 |
|---|---|---|
| WO | 2016014097 A1 | 1/2016 |

OTHER PUBLICATIONS

"The Trouble Transporting Tribbles (or File Verification using MD5 Checksums)", https://www.controlledvocabulary.com/imagedatabases/file-verification.html, Published on: Jul. 2010, 14 pages.

*Primary Examiner* — Izunna Okeke
(74) *Attorney, Agent, or Firm* — Wade IP Law PLLC

(57) ABSTRACT

Techniques are described herein that are capable of providing security for code between a code generator and a compiler. The code generator generates source code. The code generator generates a first checksum of a file that includes the source code. The code generator provides the first checksum to the compiler via a secure channel. The compiler generates a second checksum of the file that includes the source code. The compiler determines whether to compile the source code based at least in part on whether the first checksum and the second checksum are the same. The first checksum and the second checksum being the same indicates that the source code is to be compiled. The first checksum and the second checksum being different indicates that the source code is not to be compiled.

20 Claims, 7 Drawing Sheets

(56) References Cited

U.S. PATENT DOCUMENTS

| | | |
|---|---|---|
| 2004/0015748 A1 | 1/2004 | Dwyer |
| 2007/0220481 A1 | 9/2007 | Gabel et al. |
| 2009/0228718 A1 | 9/2009 | Manferdelli et al. |
| 2015/0378697 A1* | 12/2015 | Sathyanathan ........... G06F 8/41 717/146 |
| 2017/0031666 A1* | 2/2017 | Sathyanathan ........... G06F 8/41 |
| 2017/0193004 A1* | 7/2017 | Karuppusamy ..... G06F 11/1004 |
| 2018/0239621 A1* | 8/2018 | Xie ........................... G06F 8/54 |

* cited by examiner

SECURITY OF CODE BETWEEN CODE GENERATOR AND COMPILER

BACKGROUND

Code generators, as their name suggests, generate computer software code. For instance, code generators may be used to generate boilerplate code (e.g., WinForms), to generate code in various programming languages based on a language-agnostic representation of the code (e.g., code document object model (CodeDOM)), and to generate code that removes the runtime overhead of performing reflection (e.g., XML serialization). A code generator typically operates by producing a file that includes the generated code, storing the file on persistent storage (e.g., disk), and then invoking a compiler (e.g., C #compiler (CSC) or Visual Basic® compiler (VBC)) with the file as input. The code generator may perform such operations as part of a software build, for example.

Because a file that is produced by a code generator is typically stored on persistent storage, if the file is stored in an unsecure location, the file may be altered (e.g., by a malicious entity) in the time between when the file is written to persistent storage by the code generator and the time when the compiler reads the file. The compiler typically generates compiled code based on the code that is generated by the code generator and stores the compiled code on the persistent storage. The compiled code may be altered (e.g., by a malicious entity), and security may be compromised if the altered compiled code is loaded into the process that requested compilation.

SUMMARY

Various approaches are described herein for, among other things, providing security for code between a code generator and a compiler. For instance, the code may include source code that is generated by the code generator and/or compiled code that is generated by the compiler. The compiler may compile the source code that is generated by the code generator to generate the compiled code. Checksum(s) may be used to provide security for the code. A checksum of a file is a datum that is generated by processing the file in accordance with a checksum function. A checksum function is a one-way function that provides a designated checksum (e.g., a substantially unique checksum) for a designated input. For instance, a determination as to whether a file has been modified may be made by processing the file using a specified checksum function to provide a current checksum and comparing the current checksum to a stored checksum of the file that was previously generated using the specified checksum function. If the current checksum and the stored checksum are the same, the file likely has not been modified since the stored checksum was generated. If the current checksum and the stored checksum are different, the file likely has been modified since the stored checksum was generated.

One example of a checksum function is a cryptographic hash function. An input of a cryptographic hash function is referred to as a "message." A checksum that is provided by (e.g., results from) a cryptographic hash function is referred to as a "message digest" (a.k.a. "digest"). Persons skilled in the art will recognize that it may be computationally infeasible to invert a cryptographic hash function (e.g., to discover the message based on the digest) and/or to generate a different message that results in the same digest.

In an example approach, a code generator generates source code. The code generator generates a first checksum of a file that includes the source code. The code generator provides the first checksum to a compiler via a secure channel. The compiler generates a second checksum of the file that includes the source code. For instance, the compiler may generate the second checksum independently from the first checksum (e.g., without taking into consideration the first checksum). The compiler determines whether to compile the source code based at least in part on whether the first checksum and the second checksum are same. The first checksum and the second checksum being the same indicates that the source code is to be compiled. The first checksum and the second checksum being different indicates that the source code is not to be compiled.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
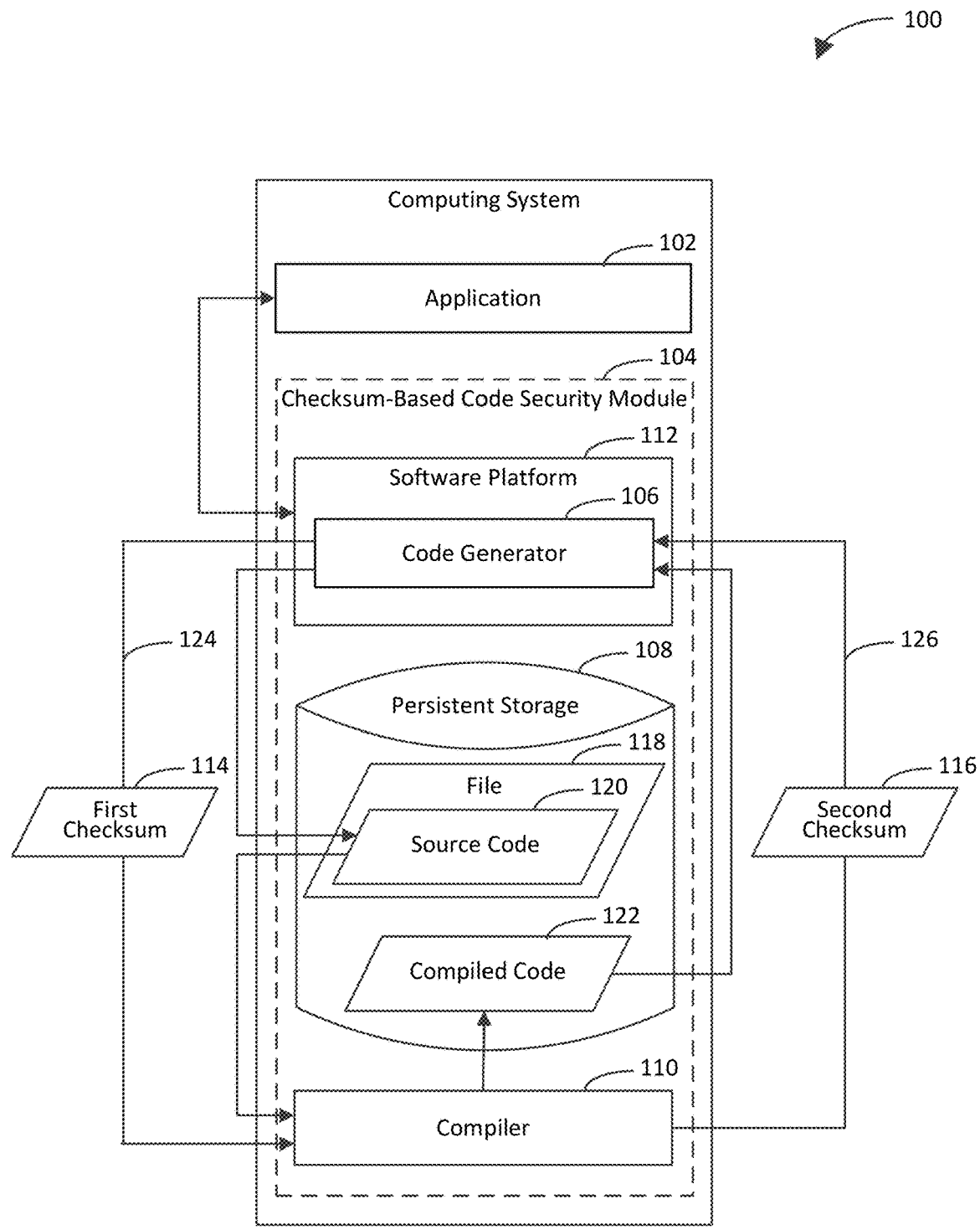
FIGS. 1 and 7 are block diagrams of example computing systems having checksum-based code security functionality in accordance with embodiments.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required. For instance, a first checksum need not necessarily precede a second checksum; a second checksum need not necessarily precede a third checksum, and so on.

II. Example Embodiments

Example embodiments described herein are capable of providing security for code between a code generator and a compiler. For instance, the code may include source code that is generated by the code generator and/or compiled code that is generated by the compiler. The compiler may compile the source code that is generated by the code generator to generate the compiled code. Checksum(s) may be used to provide security for the code. A checksum of a file is a datum that is generated by processing the file in accordance with a checksum function. A checksum function is a one-way function that provides a designated checksum (e.g., a substantially unique checksum) for a designated input. For instance, a determination as to whether a file has been modified may be made by processing the file using a specified checksum function to provide a current checksum and comparing the current checksum to a stored checksum of the file that was previously generated using the specified checksum function (i.e., the same checksum function that is used to generate the current checksum). If the current checksum and the stored checksum are the same, the file likely has not been modified since the stored checksum was generated. If the current checksum and the stored checksum are different, the file likely has been modified since the stored checksum was generated.

One example of a checksum function is a cryptographic hash function. An input of a cryptographic hash function is referred to as a "message." A checksum that is provided by (e.g., results from) a cryptographic hash function is referred to as a "message digest" (a.k.a. "digest"). Persons skilled in the art will recognize that it may be computationally infeasible to invert a cryptographic hash function (e.g., to discover the message based on the digest) and/or to generate a different message that results in the same digest.

Example techniques described herein have a variety of benefits as compared to conventional techniques for providing security for code. For instance, the example techniques may be capable of providing greater security for code (e.g., against tampering) than the conventional techniques as the code is passed between a code generator and a compiler, especially when the code is stored on persistent storage (e.g., in an unsecure location). For example, a likelihood that a malicious entity is able to modify source code without detection in the time between when the source code is written to persistent storage by the code generator and the time when the source code is read by the compiler may be reduced (e.g., eliminated). In another example, a likelihood that a malicious entity is able to modify compiled code without detection between the time when the compiled code is written to persistent storage by the compiler and the time when the compiled code is read by the code generator may be reduced. The example techniques may increase integrity of the source code and/or the compiled code.

The example embodiments may isolate checksum(s) from code that was used to generate the checksum(s). For example, the checksum(s) may be provided via secure channel(s). A secure channel is a channel in which information (e.g., files, code, checksums) cannot be modified by a malicious entity. In one aspect of this example, the code may be provided via unsecure channel(s). Accordingly, even if a malicious entity gains access to the unsecure channel(s), a modification of the code may be detected based on the checksum(s) that are provided via the secure channel(s). In another aspect of this example, the code may be provided via secure channel(s) to increase security of the code.

FIG. 1 is a block diagram of an example computing system 100 having checksum-based code security functionality in accordance with an embodiment. The computing system 100 includes one or more processing systems. An example of a processing system is a system that includes at least one processor that is capable of manipulating data in accordance with a set of instructions. For instance, a processing system may be a computer (e.g., a desktop computer, a laptop computer, a tablet computer, a wearable computer such as a smart watch or a head-mounted computer), a personal digital assistant, a cellular telephone, etc.

As shown in FIG. 1, the computing system 100 includes an application 102 and a checksum-based code security module 104. The checksum-based code security module 104 provides the aforementioned checksum-based code security functionality, which provides security for code between a code generator 106 and a compiler 110. The checksum-based code security module 104 includes the code generator 106, a persistent storage 108, and the compiler 110.

The code generator 106 is shown to be included in a software platform 112 for non-limiting illustrative purposes. One example of a software platform is the .NET Framework™, developed and distributed by Microsoft Corporation. The application 102 performs operations in response to inputs that are received from a user of the computing system 100. The application 102 interacts with the software platform 112 to utilize services (e.g., code generation and compilation services) that are provided by software the platform 112 to perform at least some of the operations.

The code generator 106 generates source code 120. The code generator 106 stores the source code 120 in a file 118 on the persistent storage 108. The code generator 106 generates a checksum 114 of the file 118 and provides the checksum 114 to the compiler 110 via a first secure channel 124. For instance, the checksum 114 may facilitate a decision by the compiler 110 as to whether the source code 120 should be compiled.

The code generator 106 generates an output checksum (not shown) of compiled code 122 that is generated by the compiler 106. The code generator 106 selectively loads the compiled code 122 depending on whether a checksum 116 received from the compiler 110 via a second secure channel 126 matches the output checksum. If the checksum 116 matches the output checksum, the code generator 106 loads the compiled code 122. If the checksum 116 does not match the output checksum, the code generator 106 does not load the compiled code 122. For instance, the checksum 116 matching the output checksum may indicate that a malicious entity has not tampered with the compiled code 122 since the compiler 110 generated the checksum 116 (e.g., since the compiler 110 stored the compiled code 122 on the persistent storage 108). The checksum 116 not matching the output checksum may indicate that a malicious entity has tampered with the compiled code 122 since the compiler 110 generated the checksum 116.

The first secure channel 124 and the second secure channel 126 may be the same or different. Each of the first secure channel 124 and the second secure channel 126 may be implemented using any suitable secure transmission technique, including but not limited to command line argument(s), named pipe(s), one or more shared memories, and secure network connection(s).

Examples of a code generator include but are not limited to CodeDOM, which generates code that a C #and/or Visual Basic (VB)® uses to produce compiled code; XmlSerializer, which generates code that describes an object, compiles the object to produce compiled code, and then loads the compiled code; and ASP.NET, which invokes a compiler to compile source code at runtime.

The compiler 110 generates a source checksum (not shown) of the file 118 that is stored on the persistent storage 108. The compiler 110 selectively compiles the source code 120, which is included in the file 118, depending on whether the checksum 114 received from the code generator 106 via the first secure channel 124 matches the source checksum. If the checksum 114 matches the source checksum, the compiler 110 compiles the source code 120. If the checksum 114 does not match the source checksum, the compiler 110 does not compile the source code 120. For instance, the checksum 114 matching the source checksum may indicate that a malicious entity has not tampered with the source code 120 since the code generator 106 generated the checksum 114 (e.g., since the code generator 106 stored the source code 120 on the persistent storage 108). The checksum 114 not matching the source checksum may indicate that a malicious entity has tampered with the source code 120 since the code generator 106 generated the checksum 114.

Compiling the source code 120 produces the compiled code 122, which the compiler 110 stores on the persistent storage 108. It will be recognized that the compiler 110 may store the compiled code 122 in file(s) on the persistent storage 108, though the example embodiments are not limited in this respect. Discussions of the compiled code 122 herein are applicable to file(s) that include the compiled code 122. The compiled code 122 may include one or more executable files and/or one or more shared libraries. Examples of a shared library include but are not limited to a dynamic link library (DLL) and a dynamic shared object (DSO). Examples of compiled code 122 include but are not limited to native code (e.g., code produced by a C++ compiler) and managed code (e.g., code produced by C #, VB, and/or Java®). The compiler 110 generates the checksum 116 of the compiled code 122 and provides the checksum 116 to the code generator 106 via the second secure channel 126. For instance, the checksum 116 may facilitate a decision by the code generator 106 as to whether the compiled code 122 should be loaded.

In a first example algorithm embodiment, the code generator 106 sends an algorithm (and/or an indicator that specifies the algorithm) that is used to generate the checksum 114 to the compiler 110 via the first secure channel 124. For instance, the code generator 106 may be capable of generating the checksum 114 using any of a variety of algorithms. The code generator 106 may select an algorithm from the variety of algorithms to generate the checksum 114 based on any one or more selection criteria. For example, the code generator may select the algorithm based on (e.g., based at least in part on) a round-robin selection technique, a random selection technique, an estimated amount of time and/or resources that are to be consumed to generate the checksum using the algorithm being less than an estimated amount of time and/or resources that are to be consumed to generate the checksum using each of the other algorithms, an estimated cryptographic security associated with the algorithm being greater than an estimated cryptographic security associated with each of the other algorithms, etc.

An estimated cryptographic security associated with an algorithm is a statistical approximation of an amount of computational effort that is required to discover another file that has the same checksum. For instance, a relatively greater estimated cryptographic security corresponds to a relatively greater statistical approximation of the amount of computational effort that is required to discover such a file, and a relatively lesser estimated cryptographic security corresponds to a relatively lesser statistical approximation of the amount of computational effort that is required to discover such a file. In one example, an "MD5" algorithm, which is known to persons skilled in the art, may be used to generate a designated checksum based on a designated file. In accordance with this example, the MD5 algorithm may be considered to have a relatively low estimated cryptographic security because determining another file that is different from the designated file and that the MD5 algorithm may use to provide the designated checksum is statistically likely to take a few hours. In another example, a "SHA256" algorithm, which is known to persons skilled in the art, may be used to generate a designated checksum based on a designated file. In accordance with this example, the SHA256 algorithm may be considered to have a relatively high estimated cryptographic security because determining another file that is different from the designated file and that the SHA256 algorithm may use to provide the designated checksum is statistically likely to take billions of years.

In accordance with this embodiment, the compiler 110 uses the algorithm to generate the source checksum in response to receipt of the algorithm and/or the indicator. For example, if the code generator 106 sends the indicator and not the algorithm, the compiler 110 may select the algorithm to generate the source checksum based on the indicator specifying the algorithm.

In a second example algorithm embodiment, the compiler 110 sends an algorithm (and/or an indicator that specifies the algorithm) that is used to generate the checksum 116 to the code generator 106 via the second secure channel 126. For instance, the compiler 110 may be capable of generating the checksum 116 using any of a variety of algorithms. The compiler 110 may select an algorithm from the variety of algorithms to generate the checksum 116 based on any one or more selection criteria, such as those mentioned above with regard to checksum 114.

In accordance with this embodiment, the code generator 106 uses the algorithm to generate the output checksum. For example, if the compiler 110 sends the indicator and not the algorithm, the code generator 106 may select the algorithm to generate the output checksum based on the indicator specifying the algorithm.

In accordance with the first and second algorithm embodiments, an algorithm to be used for generating the checksum 114 and/or the checksum 116 may be based on the capabilities of the code generator 106 and the compiler 110. For instance, the algorithm may be selected based at least in part on the code generator 106 and the compiler 110 both being capable of using the algorithm to generate a checksum. In one example, the code generator 106 and the compiler 110 may communicate (e.g., using a handshaking technique) to determine which of the algorithms the code generator 106 and the compiler 110 are capable of using. In another example, the code generator 106 and the compiler 110 may be maintained to have the same capabilities. For instance, the code generator 106 and the compiler 110 may be updated at the same time to ensure that they are capable of using the same algorithms to generate a checksum. The algorithm may be selected based on the algorithm being deemed the most secure algorithm that the code generator 106 and the compiler 110 are capable of using, though the scope of the example embodiments is not limited in this respect.

An algorithm that is used to generate any of the checksums described herein may be a cryptographically strong algorithm that is collision-resistant, though the scope of the example embodiments is not limited in this respect. For instance, a malicious entity may have substantial difficulty in creating a file that is different from a file (e.g., code) that is stored on the persistent storage 108 by the code generator 106 or the compiler 110 and that has the same checksum. Example algorithms that may be used to generate any of the checksums described herein include but are not limited to a SHA256 algorithm, an asymmetric signature algorithm, and a key exchange algorithm. One example of an asymmetric signature algorithm is an RSA algorithm. One example of a key exchange algorithm is a Diffie-Hellman algorithm. For instance, a Diffie-Hellman algorithm may be used to provide after-the-fact authentication of an entity that generated a file that is utilized by the algorithm.

In an example process embodiment, the code generator 106 creates a process that launches the compiler 110. The process may serve as a secure channel for sending checksums between the code generator 106 and the compiler. For example, the code generator 106 may use the process to provide the checksum 114 to the compiler. In another example, the compiler 110 may use the process to provide the checksum 116 to the code generator 106. Any of the checksums described herein may be stored in a secure location, such as the memory of the process that launches the compiler 110.

It will be recognized that the file 118 may include multiple files, each of which may include a respective portion of the source code 120. For instance, the code generator 106 may generate a checksum for each of the files. When the code generator 106 calls the compiler 110 to compile the source code 120, the code generator 106 may pass along the checksums to the compiler 110. For instance, the checksum 114 may include the checksums for the various files or a single (e.g., combined) checksum for all the files. The compiler 110 may determine whether the source code 120 is to be compiled depending on whether the checksums that the code generator 106 generated for the respective files are the same as source checksums that the compiler 110 generates for the respective files.

In one example, the compiler 110 may compile the source code 120 if all of the checksums that the code generator 106 generated for the respective files are the same as the source checksums that the compiler 110 generates for the respective files. In accordance with this example, the compiler 110 may not compile the source code 120 if any of the checksums that the code generator 106 generated for the respective files is not the same as the source checksum that the compiler 110 generates for the respective file.

In another example, for each portion of the source code 120, the compiler 110 may compile the respective portion if the checksum that the code generator 106 generated for the respective file is the same as the source checksum that the compiler 110 generates for the respective file. In accordance with this example, for each portion of the source code 120, the compiler 110 may not compile the respective portion if the checksum that the code generator 106 generated for the respective file is not the same as the source checksum that the compiler 110 generates for the respective file.

It will be further recognized that the compiled code 122 may include multiple portions, which may be stored in respective files. For instance, the compiler 110 may generate a checksum for each of the files. The compiler 110 may pass along the checksums to the code generator 106. For instance, the checksum 116 may include the checksums for the various files. The code generator 106 may determine whether the compiled code 122 is to be loaded depending on whether the checksums that the compiler 110 generated for the respective files are the same as output checksums that the code generator 106 generates for the respective files.

In one example, the code generator 106 may load the compiled code 122 if all of the checksums that the compiler 110 generated for the respective files are the same as the output checksums that the code generator 106 generates for the respective files. In accordance with this example, the code generator 106 may not load the compiled code 122 if any of the checksums that the compiler 110 generated for the respective files is not the same as the output checksum that the code generator 106 generates for the respective file.

In another example, for each portion of the compiled code 122, the code generator 106 may load the respective portion if the checksum that the compiler 110 generated for the respective file is the same as the output checksum that the code generator 106 generates for the respective file. In accordance with this example, for each portion of the compiled code 122, the code generator 106 may not load the respective portion if the checksum that the compiler 110 generated for the respective file is not the same as the output checksum that the code generator 106 generates for the respective file.

It will be recognized that computing system 100 may not include one or more of the application 102, the code generator 106, the persistent storage 108, the compiler 110, and/or the software platform 112. Furthermore, computing system 100 may include components in addition to or in lieu of the application 102, the checksum-based code security module 104, the code generator 106, the persistent storage 108, the compiler 110, and/or the software platform 112.

The checksum-based code security module 104 may be implemented in various ways to provide security for code (e.g., source code 120 and/or compiled code 122) between the code generator 106 and the compiler 110, including being implemented in hardware, software, firmware, or any combination thereof. For example, the checksum-based code security module 104 may be implemented as computer program code configured to be executed in one or more processors. In another example, the checksum-based code security module 104 may be implemented as hardware logic/electrical circuitry. For instance, the checksum-based code security module 104 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

The computing system 100 may be a single computing device or multiple computing devices. Accordingly, the checksum-based code security module 104 may be included in a single device or distributed among multiple devices. Each of the devices may be a user device or a server. Thus, some aspects of the checksum-based code security functionality that is described above with reference to the checksum-based code security module 104 may be incorporated in a user device, and other aspects of the functionality may be incorporated in one or more servers.

Figure 2:
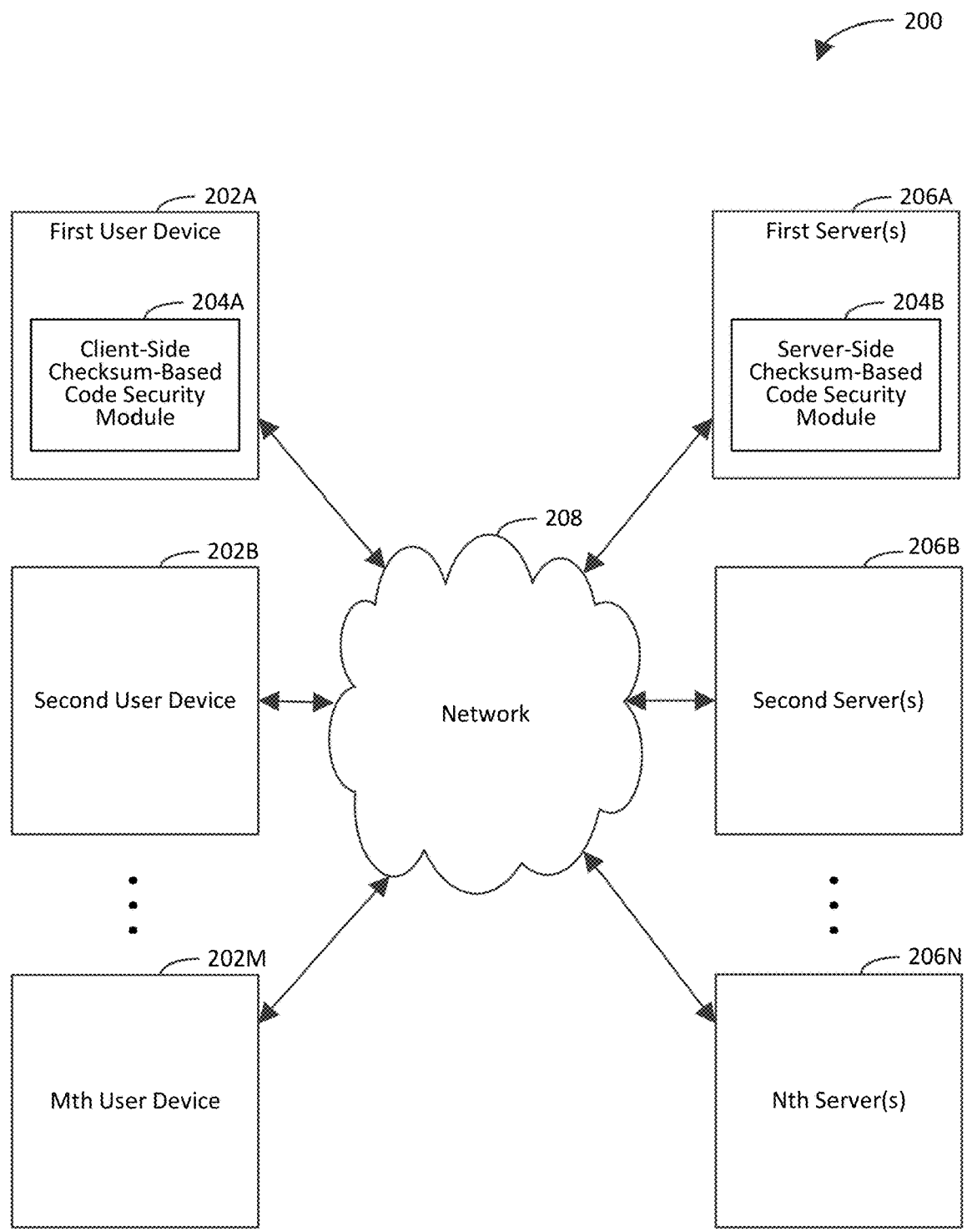
FIG. 2 is a block diagram of an example checksum-based code security system in accordance with an embodiment.

FIG. 2 is a block diagram of an example checksum-based code security system 200 in accordance with an embodiment. Generally speaking, the checksum-based code security system 200 operates to provide information to users in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, the checksum-based code security system 200 provides security for code between a code generator and a compiler. Further detail regarding example techniques for providing security for code between a code generator and a compiler is provided below with regard to FIGS. 3-8.

As shown in FIG. 2, the checksum-based code security system 200 includes a plurality of user systems 202A-202M, a plurality of servers 206A-206N, and a network 208. Communication among the user systems 202A-202M and the servers 206A-206N is carried out over the network 208 using well-known network communication protocols. The network 208 may be a wide-area network (e.g., the Internet), a local area network (LAN), another type of network, or a combination thereof.

The user systems 202A-202M are processing systems that are capable of communicating with the servers 206A-206N. The user systems 202A-202M are configured to provide requests to the servers 206A-206N for requesting information stored on (or otherwise accessible via) the servers 206A-206N. For instance, a user may initiate a request for executing a computer program (e.g., an application) using a client (e.g., a Web browser, Web crawler, or other type of client) deployed on a user system 202 that is owned by or otherwise accessible to the user. In accordance with some example embodiments, the user systems 202A-202M are capable of accessing domains (e.g., Web sites) hosted by the servers 206A-206N, so that the user systems 202A-202M may access information that is available via the domains. Such domain may include Web pages, which may be provided as hypertext markup language (HTML) documents and objects (e.g., files) that are linked therein, for example.

A first user device 202A is shown to include a client-side checksum-based code security module 204a for illustrative purposes. The client-side checksum-based code security module 204a provides client-side aspects of the checksum-based code security functionality described above with respect to checksum-based code security module 104 shown in FIG. 1. For instance, the client-side checksum-based code security module 204a may include a code generator that interacts (e.g., communicates) with a compiler that is included in a server-side checksum-based code security module 204b to implement one or more of the example techniques described herein.

Each of the user devices 202A-202M may include any client-enabled system or device, including but not limited to a desktop computer, a laptop computer, a tablet computer, a wearable computer such as a smart watch or a head-mounted computer, a personal digital assistant, a cellular telephone, or the like. It will be recognized that any one or more user systems 202A-202M may communicate with any one or more servers 206A-206N.

The servers 206A-206N are processing systems that are capable of communicating with the user systems 202A-202M. The servers 206A-206N are configured to execute computer programs that provide information to users in response to receiving requests from the users. For example, the information may include documents (e.g., Web pages, images, audio files, video files, etc.), output of executables, or any other suitable type of information. In accordance with some example embodiments, the servers 206A-206N are configured to host respective Web sites, so that the Web sites are accessible to users of the checksum-based code security system 200.

First server(s) 206A are shown to include the server-side checksum-based code security module 204b for illustrative purposes. The server-side checksum-based code security module 204b provides server-side aspects of the checksum-based code security functionality described above with respect to checksum-based code security module 104 shown in FIG. 1. For example, the server-side checksum-based code security module 204b may include a compiler that interacts (e.g., communicates) with a code generator that is included in the client-side checksum-based code security module 204a to implement one or more of the example techniques described herein. In accordance with this example, the server-side checksum-based code security module 240b may provide a compilation web service to the code generator.

The client-side checksum-based code security module 204a is shown to be incorporated in the first user device 202A for illustrative purposes and is not intended to be limiting. It will be recognized the client-side checksum-based code security module 204a may be incorporated in any one or more of the user systems 202A-202M. The server-side checksum-based code security module 204b is shown to be incorporated in the first sever(s) 206A for illustrative purposes and is not intended to be limiting. It will be recognized the server-side checksum-based code security module 204b may be incorporated in any one or more of the servers 206A-206N.

Figure 3:
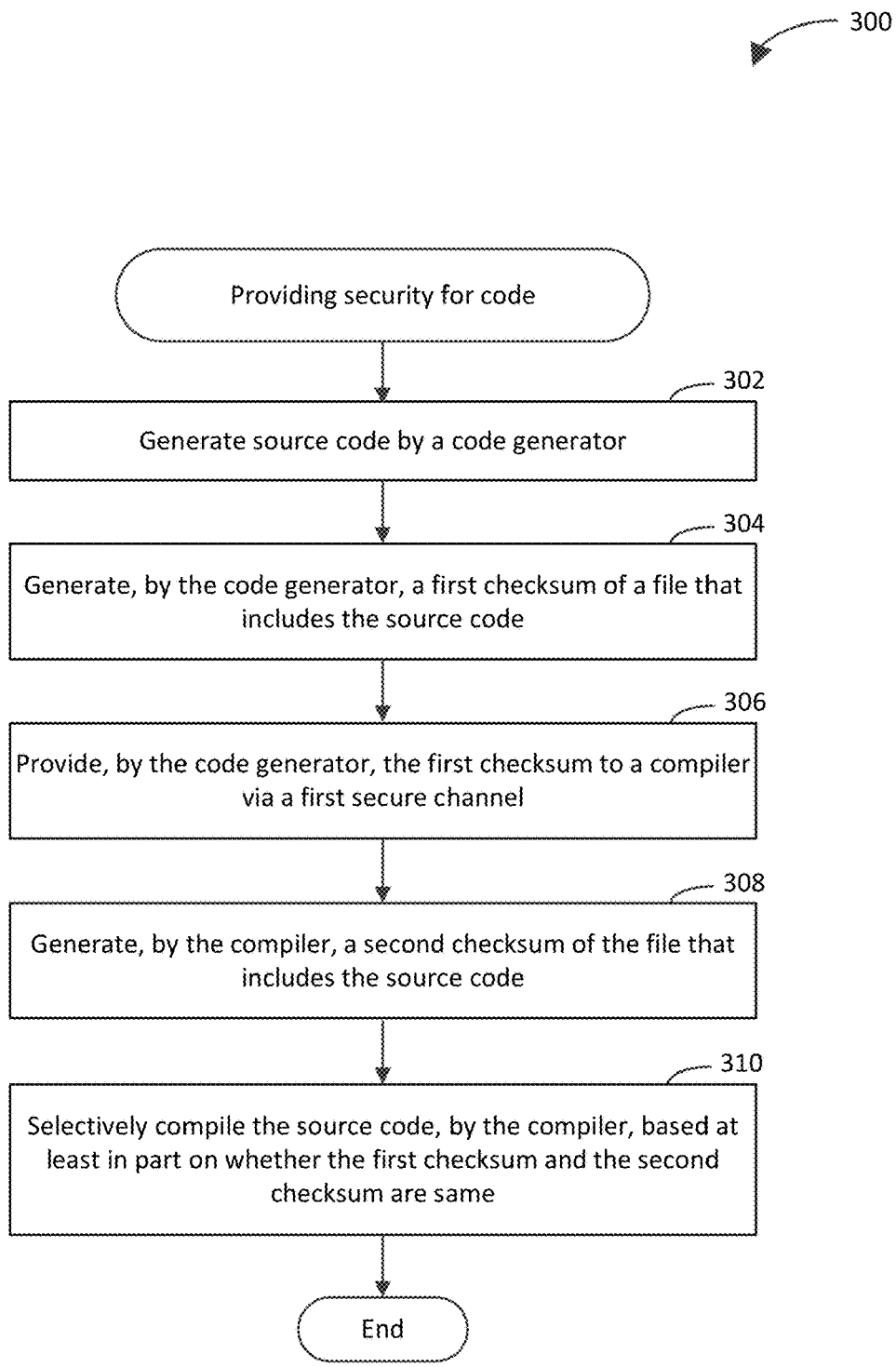
FIGS. 3-4 depict flowcharts of example methods for providing security for code in accordance with embodiments.
Figure 4:
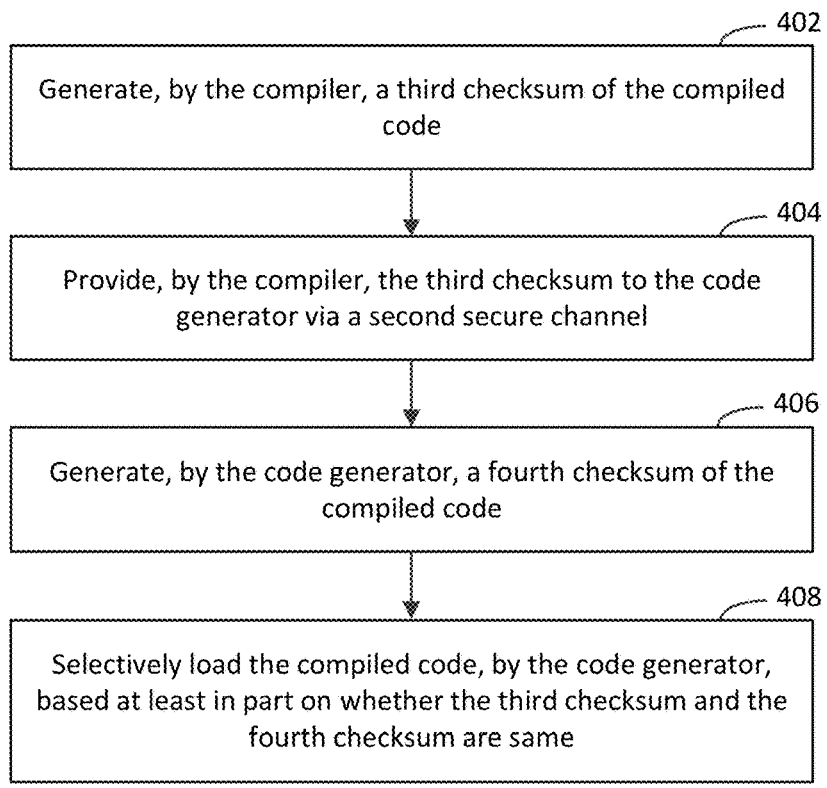
Figure 5:
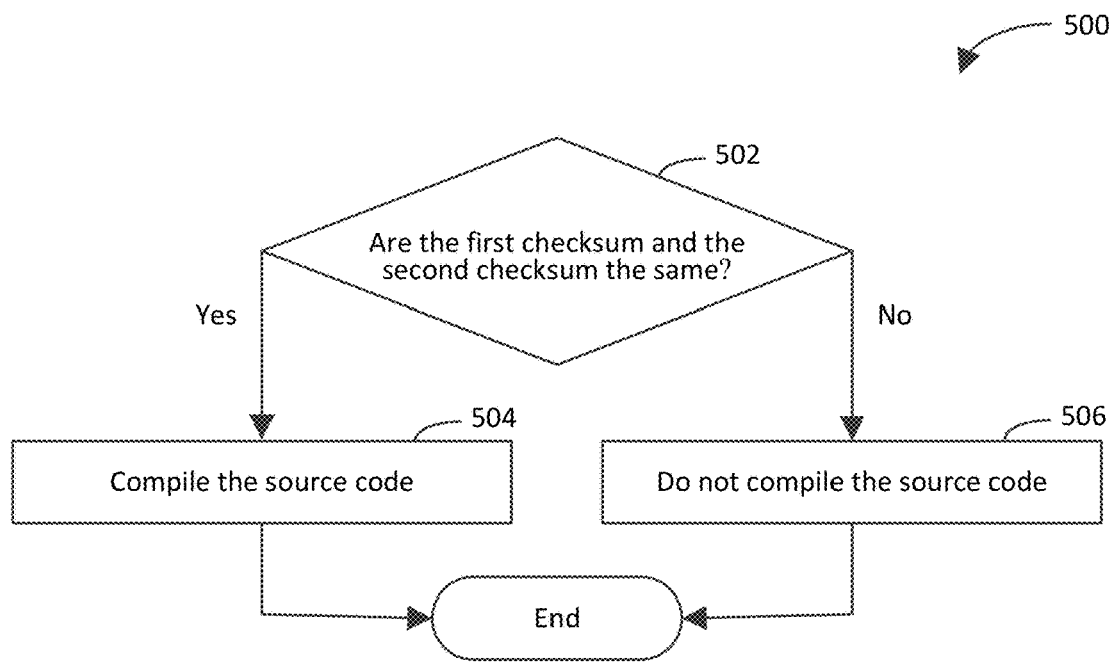
FIG. 5 depicts a flowchart of an example method for selectively compiling source code in accordance with an embodiment.
Figure 6:
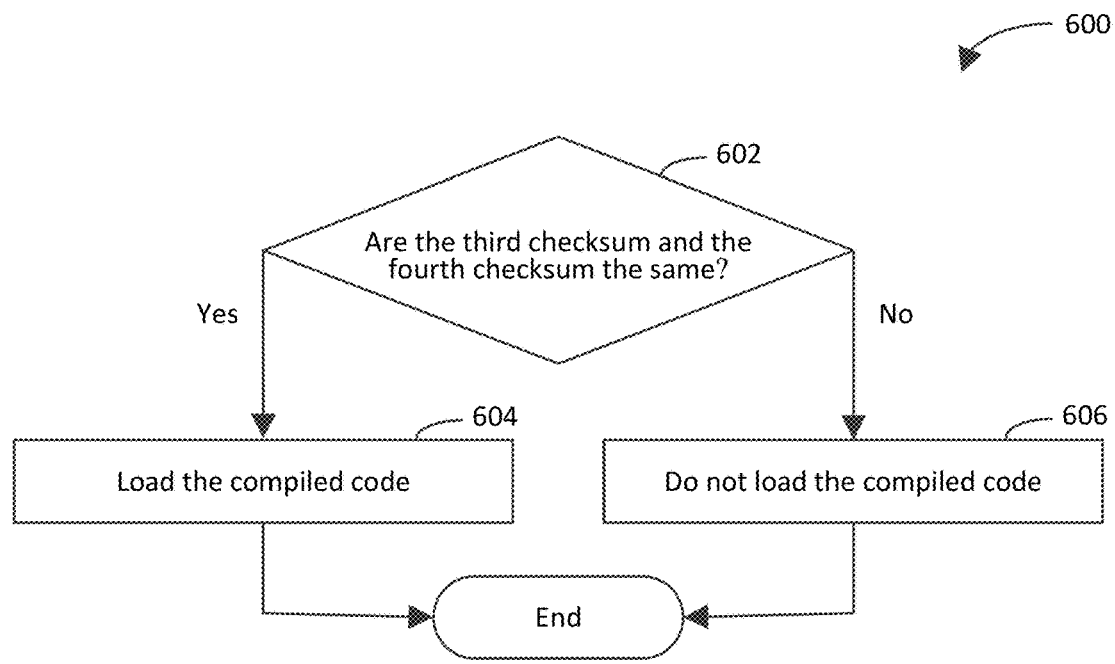
FIG. 6 depicts a flowchart of an example method for selectively loading compiled code in accordance with an embodiment.
Figure 7:
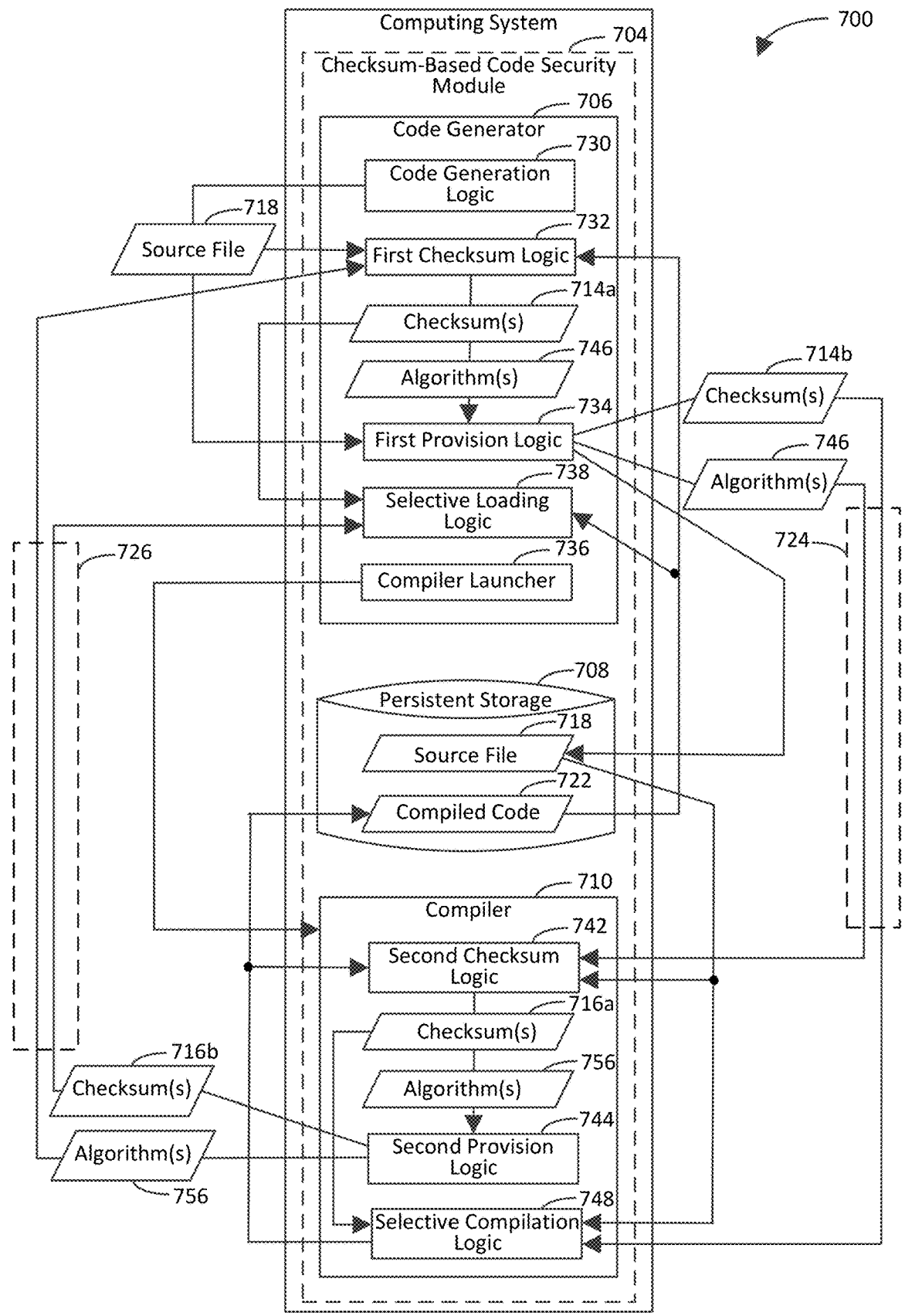

FIGS. 3-4 depict flowcharts 300 and 400 of example methods for providing security for code in accordance with embodiments. FIG. 5 depicts a flowchart 500 of an example method for selectively compiling source code in accordance with an embodiment. FIG. 6 depicts a flowchart 600 of an example method for selectively loading compiled code in accordance with an embodiment. The flowcharts 300, 400, 500, and 600 may be performed by the checksum-based code security module 104 shown in FIG. 1, for example. For illustrative purposes, flowcharts 300, 400, 500, and 600 are described with respect to a computing system 700 shown in FIG. 7. The computing system 700 may include one or more of the user systems 202A-202M, one or more of the server(s) 206A-206N, or any combination thereof, though the scope of the example embodiments is not limited in this respect. The computing system 700 includes a checksum-based code security module 704, which is an example implementation of the checksum-based code security module 104 shown in FIG. 1. The checksum-based code security module 704 includes a code generator 706, a persistent storage 708, and a compiler 710. The code generator 706 includes code generation logic 730, first checksum logic 732, first provision logic 734, compiler launcher 736, and selective loading logic 738. The compiler 710 includes second checksum logic 742, second provision logic 744, and selective compilation logic 748. Further structural and operational embodiments will be apparent to persons skilled in the relevant art(s) based on the discussion regarding flowcharts 300, 400, 500, and 600.

As shown in FIG. 3, the method of flowchart 300 begins at step 302. In step 302, source code is generated by a code generator. In an example implementation, the code generation logic 730 generates a source file 718, which includes the source code. For instance, the code generation logic 730 may translate a concept (e.g., an if statement or a loop) that is language-agnostic into the source file 718. The source file 718 may correspond to a designated computer programming language. The concept may be defined differently in different languages. For example, the code generation logic 730 may produce text in the source file 718 to conform to a designated computer programming language. The code generation logic 730 may generate the text in any of a variety of ways. For example, the code generation logic 730 may generate the text as plain text. In another example, the code generation logic 730 may use its own technology to produce the text based on a model (e.g., a language-agnostic model). In accordance with this implementation, the first provision logic 734 writes the source file 718 to the persistent storage 708. In an administrator example in which a user of the computing system 700 is operating as an administrator, the first provision logic 734 may write the source file 718 to a relatively high integrity folder. In accordance with this example, folders on the persistent storage 708 may be classified as relatively low integrity, medium integrity, or relatively high integrity. A relatively low integrity folder may be modified by substantially all entities. A relatively high integrity folder does not allow an entity to modify the folder unless the entity is deemed to have a relatively high integrity (e.g., a user with administrative privileges).

At step 304, a first checksum of a file that includes the source code is generated (e.g., computed) by the code generator. For example, the first checksum may be based on the source code. In another example, the first checksum may be produced atomically with the source code. In one aspect of this example, the first checksum may be produced in memory while the file is being written, utilizing filesystem lock mechanisms to ensure that the file has not been written before the first checksum is determined externally. In another aspect, the first checksum may be produced in memory, and the file may be written thereafter or while retaining the source code in memory. In an example implementation, the first checksum logic 732 generates the first checksum of the source file 718. In accordance with this implementation, the first checksum is included in checksum(s) 714a.

At step 306, the first checksum is provided to a compiler via a first secure channel by the code generator. The first secure channel may be isolated (e.g., independent) from a channel via which the source code is provided from the code generator to the compiler. The first checksum may be isolated from the source code such that the first checksum and the source code are not stored together on persistent storage. In an example implementation, the first provision logic 734 provides checksum(s) 714b, which are a subset of the checksum(s) 714a, to the compiler 710 via a first secure channel 724. The checksum(s) 714b include the first checksum. In one example, the first provision logic 734 may provide the first checksum to the compiler 710 via command line argument(s). In accordance with this example, the first provision logic 734 may indicate in an output (e.g., standard out) of the command line that the first checksum corresponds to the source file 718. In another example, the first provision logic 734 may provide the first checksum to the compiler 710 via one or more named pipes.

At step 308, a second checksum of the file that includes the source code is generated by the compiler. For example, the compiler may generate the second checksum independently from the first checksum (e.g., without taking into consideration the first checksum). In another example, the second checksum may be based on the source code. In yet another example, the second checksum may be produced atomically with the source code. In an aspect of this example, the second checksum may be produced while the file is being read into memory, utilizing filesystem lock mechanisms. In an example implementation, the second checksum logic 742 generates the second checksum of the source file 718. In accordance with this implementation, the second checksum is included in checksum(s) 716a. For example, the second checksum logic 742 may generate the second checksum in response to reading the source file 718 from the persistent storage 708.

At step 310, the source code is selectively compiled by the compiler based at least in part on whether the first checksum and the second checksum are same (e.g., identical). The first checksum and the second checksum being the same indicates that the source code is to be compiled. The first checksum and the second checksum being different indicates that the source code is not to be compiled. In an example implementation, selective compilation logic 748 selectively compiles the source code in the source file 718 based at least in part on whether the first checksum, which is included in the checksum(s) 714b, and the second checksum, which is included in the checksum(s) 716a, are the same.

It will be recognized that when using some algorithms, such as an RSA algorithm or a key exchange algorithm, a resulting checksum need not necessarily be communicated over a secure channel (e.g., first secure channel 724). Such algorithms may instead rely on the security of cryptographic keys known to the code generator and the compiler. In one example implementation that utilizes such an algorithm without requiring a secure channel during compilation, the code generator may share a secret key with the compiler in advance. For instance, the code generator and the compiler may be on different machines, and an administrator may place the secret key on both machines. In accordance with this example, the code generator may compute a type of checksum that is referred to as a keyed-hash message authentication code (HMAC), which may use both the code from the file and the secret key. For instance, it may not be feasible for an attacker to compute an HMAC without knowing the secret key. In further accordance with this example, the code generator may communicate the HMAC and the code from the file through an unsecured channel. In further accordance with this example, the compiler may compute the HMAC based on the code and the secret key and compare the computed HMAC to the HMAC that was received over the unsecured channel to determine whether they match. It should be noted that other cryptographic techniques may be used to follow similar protocols without a secret key being shared in advance. For instance, certificate(s) that authenticate each process may be issued by a trusted authority.

In some example embodiments, one or more steps 302, 304, 306, 308, and/or 310 of flowchart 300 may not be performed. Moreover, steps in addition to or in lieu of steps 302, 304, 306, 308, and/or 310 may be performed. For instance, in an example embodiment, the method of flowchart 300 further includes providing, by the code generator, a designated algorithm that is used to generate the first checksum to the compiler via the first secure channel. In an example implementation, the first provision logic 734 provides algorithm(s) 746 to the compiler 710 via the first secure channel 724. The algorithm(s) 746 include the designated algorithm that is used to generate the first checksum. In accordance with this embodiment, generating the second checksum at step 308 includes using, by the compiler, the designated algorithm that is received from the code generator to generate the second checksum. For instance, the second checksum logic 742 may use the designated algorithm that is received from the first provision logic 734 to generate the second checksum.

In an aspect of this embodiment, the code generator supports multiple algorithms for generating checksums. In one example of this aspect, the method of flowchart 300 further includes selecting, by the code generator, the designated algorithm from the multiple algorithms in accordance with a round-robin selection technique to be used to generate the first checksum. For instance, the first checksum logic 732 may select the designated algorithm from the multiple algorithms in accordance with the round-robin selection technique.

In another example of this aspect, the method of flowchart 300 further includes randomly selecting, by the code generator, the designated algorithm from the multiple algorithms to be used to generate the first checksum. For instance, the first checksum logic 732 may randomly select the designated algorithm from the multiple algorithms.

In yet another example of this aspect, the method of flowchart 300 further includes communicating, by the code generator, with the compiler (e.g., in accordance with a handshake technique) to determine which of the multiple algorithms are supported by the compiler. For instance, the first checksum logic 732 may communicate with the second checksum logic 742 to determine which of the multiple algorithms are supported by the compiler 710. The first provision logic 734 may provide a request that is received from the first checksum logic 732 to the second checksum logic 742. The request may request that the second checksum logic 742 specify which of the multiple algorithms are supported by the compiler 710. The second checksum logic 742 may generate a response to the request. The response may specify the subset of the multiple algorithms that is supported by the compiler 710. The second provision logic 744 may provide the response to the first checksum logic 732. In accordance with this example, the method of flowchart 300 further includes selecting, by the code generator, the designated algorithm from a subset of the multiple algorithms, which is indicated by the compiler to be supported by the compiler, to be used to generate the first checksum. For instance, the first checksum logic 732 may select the designated algorithm from the subset of the multiple algorithms, which is specified by the second checksum logic 742 to be supported by the compiler 710, to be used to generate the first checksum.

In another example embodiment, the code generator and the compiler may be maintained to support the same algorithms for generating checksums. For example, the code generator and the compiler may be updated at the same time to ensure that each of the code generator and the compiler is capable of using any algorithm that the other might use. In another example, the code generator and the compiler may be configured to utilize a common (e.g., default) algorithm.

In yet another example embodiment, the method of flowchart 300 further includes creating, by the code generator, a process that runs the compiler. For instance, the compiler launcher 736 may create the process that runs the compiler 710, as indicated by arrow 758. In accordance with this embodiment, providing the first checksum at step 306 includes using, by the code generator, the process to provide the first checksum to the compiler via the first secure channel. For example, the first provision logic 734 may use the process to provide the first checksum to the compiler 710 via the first secure channel 724. In accordance with this example, the process itself may serve as the first secure channel 724. The first provision logic 734 may use the process to provide the source file 718 to the compiler 710 via the first secure channel 724, though the scope of the example embodiments is not limited in this respect. It will be recognized that the compiler launcher 736 may use command line argument(s) to start the compiler 710. The command line argument(s) may include information about checksums. For instance, the command line argument(s) may include the first checksum.

In still another example embodiment, the method of flowchart 300 includes one or more of the steps shown in flowchart 400 of FIG. 4. In accordance with this embodiment, selectively compiling the source code at step 310 includes compiling the source code, by the compiler, to provide compiled code in response to the first checksum and the second checksum being the same. The compiled code may include one or more executable files and/or one or more shared libraries. In an example implementation, the selective compilation logic 748 may compile the source code to provide compiled code 722 in response to the first checksum and the second checksum being the same.

As shown in FIG. 4, the method of flowchart 400 begins at step 402. In step 402, a third checksum of the compiled code is generated by the compiler. In an example implementation, the second checksum logic 742 generates the third checksum of the compiled code 722. In accordance with this implementation, the third checksum is included in checksum(s) 716a.

It will be recognized that the second checksum logic 742 may utilize a first algorithm to generate the second checksum at step 308 of FIG. 3 and a second algorithm to generate the third checksum at step 402, though the scope of the example embodiments is not limited in this respect. The first algorithm and the second algorithm may be the same or different.

At step 404, the third checksum is provided by the compiler to the code generator via a second secure channel. The second secure channel may be isolated (e.g., independent) from a channel via which the compiled code is provided from the compiler to the code generator. The third checksum may be isolated from the compiled code such that the third checksum and the compiled code are not stored together on persistent storage. In an example implementation, the second provision logic 744 provides the checksum(s) 716b, which are a subset of the checksum(s) 716a, to the code generator 704 via the second secure channel 726. The checksum(s) 716b include the third checksum. The first secure channel 724 and the second secure channel 726 may be the same or different.

In one example, the second provision logic 744 may provide the third checksum to the code generator 706 via a console (i.e., a command line output). In accordance with this example, the second provision logic 744 may generate (e.g., write) the third checksum corresponding to the compiled code 722 on the command line. The console may be monitored by a process that the code generator used to invoke the compiler. The process may read values of checksums, including the third checksum, for the compiled code and store the values in a secure location (e.g., in memory of the process). In another example, the second provision logic 744 may provide the third checksum to the code generator 706 via one or more named pipes. These named pipe(s) may or may not be the same as named pipe(s) via which the code generator 706 provides the first checksum.

At step 406, a fourth checksum of the compiled code is generated by the code generator. For instance, the code generator may generate the fourth checksum independently from the third checksum (e.g., without taking into consideration the third checksum). In an example implementation, the first checksum logic 732 generates the fourth checksum of the compiled code 722. In accordance with this implementation, the fourth checksum is included in checksum(s) 714a. For instance, the first checksum logic 732 may generate the fourth checksum in response to reading the compiled code 322 from the persistent storage 708.

It will be recognized that the first checksum logic 732 may utilize a first algorithm to generate the first checksum at step 304 of FIG. 3 and a second algorithm to generate the fourth checksum at step 406, though the scope of the example embodiments is not limited in this respect. The first algorithm and the second algorithm may be the same or different.

At step 408, the compiled code is selectively loaded by the code generator based at least in part on whether the third checksum and the fourth checksum are same. The third checksum and the fourth checksum being the same indicates that the compiled code is to be loaded. The third checksum and the fourth checksum being different indicates that the compiled code is not to be loaded. As mentioned above, the code generator may create a process that runs the compiler. The compiled code may be loaded into the process that the code generator creates to run the compiler or a different process. In an example implementation, selective loading logic 738 selectively loads the compiled code 722 based at least in part on whether the third checksum, which is included in the checksum(s) 716b, and the fourth checksum, which is included in the checksum(s) 714a, are the same.

It should be noted that the output of the compiler may include one or more files in addition to the compiled code. For instance, the output of the compiler may include XML file(s), documentation file(s), resource file(s), etc. The checksum techniques described herein may be applied to any one or more (e.g., all) of the files that are included in the output of the compiler. For example, each of the files may have a corresponding checksum. Accordingly, the compiler may generate a checksum for each of the files, and the code generator may compare those checksums to checksums of the files that the code generator generates to determine whether the respective files have been modified. When the compiler writes the compiled code and the other files to persistent storage, the command line output of the compiler may include the following (assuming for this example that the compiled code is named "library.dll"):

library.dll: CHECKSUM
bar.xml: CHECKSUM

The code generator may then determine, by reading the command line output, which checksum corresponds to each file.

In some example embodiments, one or more steps 402, 404, 406, and/or 408 of flowchart 400 may not be performed. Moreover, steps in addition to or in lieu of steps 402, 404, 406, and/or 408 may be performed. For instance, in an example embodiment, the method of flowchart 400 further includes providing, by the compiler, a designated algorithm that is used to generate the third checksum to the code generator via the second secure channel. In an example implementation, the second provision logic 744 provides algorithm(s) 756 to the code generator 706 via the second secure channel 726. The algorithm(s) 756 include the designated algorithm that is used to generate the third checksum. In accordance with this embodiment, generating the fourth checksum at step 406 includes using, by the code generator, the designated algorithm that is received from the compiler to generate the fourth checksum. For instance, the first checksum logic 732 may use the designated algorithm that is received from the second provision logic 744 to generate the fourth checksum.

In an aspect of this embodiment, the compiler supports multiple algorithms for generating checksums. In one example of this aspect, the method of flowchart 400 further includes selecting, by the compiler, the designated algorithm from the multiple algorithms in accordance with a round-robin selection technique to be used to generate the third checksum. For instance, the second checksum logic 742 may select the designated algorithm from the multiple algorithms in accordance with the round-robin selection technique In another example of this aspect, the method of flowchart 400 further includes randomly selecting, by the compiler, the designated algorithm from the multiple algorithms to be used to generate the third checksum. For instance, the second checksum logic 742 may randomly select the designated algorithm from the multiple algorithms.

In another example embodiment, the method of flowchart 400 further includes creating, by the code generator, a process that runs the compiler. For instance, the compiler launcher 736 may create the process that runs the compiler 710, as indicated by arrow 758. In accordance with this embodiment, providing the first checksum at step 306 includes using, by the code generator, the process to provide the first checksum to the compiler via the first secure channel. For example, the first provision logic 734 may use the process to provide the first checksum to the compiler 710 via the first secure channel 724. In further accordance with this embodiment, providing the third checksum at step 404 includes using, by the compiler, the process to provide the third checksum to the code generator via the second secure channel. For instance, the second provision logic 744 may use the process to provide the third checksum to the code generator 706 via the second secure channel 726.

In one aspect of this embodiment, the code generator may use the process to provide the source code to the compiler via the first secure channel. In another aspect, the compiler may use the process to provide the compiled code to the code generator via the second secure channel. In yet another aspect, the process may re-direct console output of the compiler to a designated memory location, the contents of which no entities other than the code generator are capable of modifying. For instance, no entities other than the code generator may be capable of replacing checksum(s) that are written to the console output with different checksum(s).

FIG. 5 depicts a flowchart 500 of an example method for selectively compiling source code in accordance with an embodiment. For instance, the method of flowchart 500 is one example implementation of step 310 shown in FIG. 3.

As shown in FIG. 5, the method of flowchart 500 begins at step 502. In step 502, a determination is made whether the first checksum and the second checksum are the same. If the first checksum and the second checksum are the same, flow continues to step 504. If the first checksum and the second checksum are not the same, flow continues to step 506. In an example implementation, the selective compilation logic 748 determines whether the first checksum and the second checksum are the same.

At step 504, the source code is compiled. In an example implementation, the selective compilation logic 748 compiles the source code.

At step 506, the source code is not compiled. In an example implementation, the selective compilation logic 748 does not compile the source code.

FIG. 6 depicts a flowchart 600 of an example method for selectively loading compiled code in accordance with an embodiment. For instance, the method of flowchart 600 is one example implementation of step 408 shown in FIG. 4.

As shown in FIG. 6, the method of flowchart 600 begins at step 602. In step 602, a determination is made whether the third checksum and the fourth checksum are the same. If the third checksum and the fourth checksum are the same, flow continues to step 604. If the third checksum and the fourth checksum are not the same, flow continues to step 606. In an example implementation, the selective loading logic 738 determines whether the third checksum and the fourth checksum are the same.

At step 604, the compiled code is loaded. In an example implementation, the selective loading logic 738 loads the compiled code 722.

At step 606, the compiled code is not loaded. In an example implementation, the selective loading logic 738 does not load the compiled code 722.

It will be recognized that the computing system 700 may not include one or more of the checksum-based code security module 704, the code generator 706, the persistent storage 708, the compiler 710, the code generation logic 730, the first checksum logic 732, the first provision logic 734, the compiler launcher 736, the selective loading logic 738, the second checksum logic 742, the second provision logic 744, and/or the selective compilation logic 748. Furthermore, the computing system 700 may include components in addition to or in lieu of the checksum-based code security module 704, the code generator 706, the persistent storage 708, the compiler 710, the code generation logic 730, the first checksum logic 732, the first provision logic 734, the compiler launcher 736, the selective loading logic 738, the second checksum logic 742, the second provision logic 744, and/or the selective compilation logic 748.

Any one or more of checksum-based code security module 104, code generator 106, compiler 110, client-side checksum-based code security module 204a, server-side checksum-based code security module 204b, checksum-based code security module 704, the code generator 706, the compiler 710, the code generation logic 730, the first checksum logic 732, the first provision logic 734, the compiler launcher 736, the selective loading logic 738, the second checksum logic 742, the second provision logic 744, the selective compilation logic 748, flowchart 300, flowchart 400, flowchart 500, and/or flowchart 600 may be implemented in hardware, software, firmware, or any combination thereof.

For example, any one or more of checksum-based code security module 104, code generator 106, compiler 110, client-side checksum-based code security module 204a, server-side checksum-based code security module 204b, checksum-based code security module 704, the code generator 706, the compiler 710, the code generation logic 730, the first checksum logic 732, the first provision logic 734, the compiler launcher 736, the selective loading logic 738, the second checksum logic 742, the second provision logic 744, the selective compilation logic 748, flowchart 300, flowchart 400, flowchart 500, and/or flowchart 600 may be implemented, at least in part, as computer program code configured to be executed in one or more processors.

In another example, any one or more of checksum-based code security module 104, code generator 106, compiler 110, client-side checksum-based code security module 204a, server-side checksum-based code security module 204b, checksum-based code security module 704, the code generator 706, the compiler 710, the code generation logic 730, the first checksum logic 732, the first provision logic 734, the compiler launcher 736, the selective loading logic 738, the second checksum logic 742, the second provision logic 744, the selective compilation logic 748, flowchart 300, flowchart 400, flowchart 500, and/or flowchart 600 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

An example code security system comprises a code generator to generate source code. The code generator is further to generate a first checksum of a file that includes the source code. The code generator is further to provide the first checksum to a compiler via a first secure channel. The example code security system further comprises the compiler to generate a second checksum of the file that includes the source code. The compiler is further to determine whether to compile the source code based at least in part on whether the first checksum and the second checksum are same. The first checksum and the second checksum being the same indicates that the source code is to be compiled. The first checksum and the second checksum being different indicates that the source code is not to be compiled.

In a first aspect of the example code security system, the code generator is further to provide a designated algorithm that is used to generate the first checksum to the compiler via the first secure channel. In accordance with the first aspect, the compiler is to use the designated algorithm that is received from the code generator to generate the second checksum.

In an example of the first aspect of the example code security system, the code generator supports a plurality of algorithms for generating checksums. In accordance with this example, the code generator is to select the designated algorithm from the plurality of algorithms in accordance with a round-robin selection technique to be used to generate the first checksum.

In another example of the first aspect of the example code security system, the code generator supports a plurality of algorithms for generating checksums. In accordance with this example, the code generator is to randomly select the designated algorithm from the plurality of algorithms to be used to generate the first checksum.

In yet another example of the first aspect of the example code security system, the code generator supports a plurality of algorithms for generating checksums. In accordance with this example, the code generator is to communicate with the compiler to determine which of the plurality of algorithms are supported by the compiler. In further accordance with this example, the code generator is to select the designated algorithm from a subset of the plurality of algorithms, which is indicated by the compiler to be supported by the compiler, to be used to generate the first checksum.

In still another example of the first aspect of the example code security system, the code generator supports a plurality of algorithms for generating checksums. In accordance with this example, the code generator is to select the designated algorithm from the plurality of algorithms to be used to generate the first checksum based at least in part on an estimated cryptographic security associated with the designated algorithm being greater than an estimated cryptographic security associated with each of the other algorithms.

In a second aspect of the example code security system, the code generator is to create a process that runs the compiler, the code generator to use the process to provide the first checksum to the compiler via the first secure channel. The second aspect of the example code security system may be implemented in combination with the first aspect of the example code security system, though the example embodiments are not limited in this respect.

In a third aspect of the example code security system, the code generator is to provide the first checksum to the compiler via at least one of (a) one or more command line arguments or (b) a shared memory. The third aspect of the example code security system may be implemented in combination with the first and/or second aspect of the example code security system, though the example embodiments are not limited in this respect.

In a fourth aspect of the example code security system, the code generator is to provide the first checksum to the compiler via at least one of (a) one or more named pipes or (b) one or more secure network connection(s). The fourth aspect of the example code security system may be implemented in combination with the first, second, and/or third aspect of the example code security system, though the example embodiments are not limited in this respect.

In a fifth aspect of the example code security system, compilation of the source code results in compiled code. In accordance with the fifth aspect, the compiler is further to generate a third checksum of the compiled code. In further accordance with the fifth aspect, the compiler is further configured to provide the third checksum to the code generator via a second secure channel. In further accordance with the fifth aspect, the code generator is further to generate a fourth checksum of the compiled code, the code generator further to determine whether to load the compiled code based at least in part on whether the third checksum and the fourth checksum are same. In further accordance with the fifth aspect, the third checksum and the fourth checksum being the same indicates that the compiled code is to be loaded. In further accordance with the fifth aspect, the third checksum and the fourth checksum being different indicates that the compiled code is not to be loaded. The fifth aspect of the example code security system may be implemented in combination with the first, second, third, and/or fourth aspect of the example code security system, though the example embodiments are not limited in this respect.

In an example of the fifth aspect of the example code security system, the compiler is further to provide a designated algorithm that is used to generate the third checksum to the code generator via the second secure channel. In accordance with the fifth aspect, the code generator is to use the designated algorithm that is received from the compiler to generate the fourth checksum.

In an implementation of this example, the compiler supports a plurality of algorithms for generating checksums. In accordance with this implementation, the compiler is to select the designated algorithm from the plurality of algorithms in accordance with a round-robin selection technique to be used to generate the third checksum.

In another implementation of this example, the compiler supports a plurality of algorithms for generating checksums. In accordance with this implementation, the compiler is to randomly select the designated algorithm from the plurality of algorithms to be used to generate the third checksum.

In another example of the fifth aspect of the example code security system, the code generator is to choose an algorithm that is used by the compiler to generate the third checksum.

In yet another example of the fifth aspect of the example code security system, the code generator is to create a process that runs the compiler. In accordance with this example, the code generator is to use the process to provide the first checksum to the compiler via the first secure channel. In further accordance with this example, the compiler is to use the process to provide the third checksum to the code generator via the second secure channel.

In still another example of the fifth aspect of the example code security system, the compiler is to provide the third checksum to the code generator via at least one of a command line output or (b) a shared memory.

In yet another example of the fifth aspect of the example code security system, the compiler is to provide the third checksum to the code generator via at least one of (a) one or more named pipes or (b) one or more secure network connections.

In a sixth aspect of the example code security system, the code generator is to generate a first keyed-hash message authentication code of the file that includes the source code using an RSA algorithm or a key exchange algorithm. In accordance with the sixth aspect, the compiler is to generate a second keyed-hash message authentication code of the file that includes the source code using the RSA algorithm or the key exchange algorithm, the compiler to determine whether to compile the source code based at least in part on whether the first keyed-hash message authentication code and the second keyed-hash message authentication code are same. In further accordance with the sixth aspect, the first keyed-hash message authentication code and the second keyed-hash message authentication code being the same indicates that the source code is to be compiled. In further accordance with the sixth aspect, the first keyed-hash message authentication code and the second keyed-hash message authentication code being different indicates that the source code is not to be compiled. The sixth aspect of the example code security system may be implemented in combination with the first, second, third, fourth, and/or fifth aspect of the example code security system, though the example embodiments are not limited in this respect.

In an example method of providing security for code, source code is generated by a code generator. A first checksum of a file that includes the source code is generated by the code generator. The first checksum is provided to a compiler by the code generator via a first secure channel. A second checksum of the file that includes the source code is generated by the compiler. The source code is selectively compiled by the compiler based at least in part on whether the first checksum and the second checksum are same. The first checksum and the second checksum being the same indicates that the source code is to be compiled. The first checksum and the second checksum being different indicates that the source code is not to be compiled.

In a first aspect of the example method, the example method further comprises providing, by the code generator, a designated algorithm that is used to generate the first checksum to the compiler via the first secure channel. In accordance with the first aspect, generating the second checksum comprises using, by the compiler, the designated algorithm that is received from the code generator to generate the second checksum.

In an example of the first aspect of the example method, the code generator supports a plurality of algorithms for generating checksums. In accordance with this example, the example method further comprises selecting, by the code generator, the designated algorithm from the plurality of algorithms in accordance with a round-robin selection technique to be used to generate the first checksum.

In another example of the first aspect of the example method, the code generator supports a plurality of algorithms for generating checksums. In accordance with this example, the example method further comprises randomly selecting, by the code generator, the designated algorithm from the plurality of algorithms to be used to generate the first checksum.

In yet another example of the first aspect of the example method, the code generator supports a plurality of algorithms for generating checksums. In accordance with this example, the example method further comprises communicating, by the code generator, with the compiler to determine which of the plurality of algorithms are supported by the compiler. In further accordance with this example, the method further comprises selecting, by the code generator, the designated algorithm from a subset of the plurality of algorithms, which is indicated by the compiler to be supported by the compiler, to be used to generate the first checksum.

In a second aspect of the example method, the example method further comprises creating, by the code generator, a process that runs the compiler. In accordance with the second aspect, providing the first checksum comprises using, by the code generator, the process to provide the first checksum to the compiler via the first secure channel. The second aspect of the example method may be implemented in combination with the first aspect of the example method, though the example embodiments are not limited in this respect.

In a third aspect of the example method, providing the first checksum comprises providing, by the code generator, the first checksum to the compiler via at least one of (a) one or more command line arguments or (b) a shared memory. The third aspect of the example method may be implemented in combination with the first and/or second aspect of the example method, though the example embodiments are not limited in this respect.

In a fourth aspect of the example method, providing the first checksum comprises providing, by the code generator, the first checksum to the compiler via at least one of (a) one or more named pipes or (b) one or more secure network connections. The fourth aspect of the example method may be implemented in combination with the first, second, and/or third aspect of the example method, though the example embodiments are not limited in this respect.

In a fifth aspect of the example method, selectively compiling the source code comprises compiling the source code, by the compiler, to provide compiled code in response to the first checksum and the second checksum being the same. In accordance with the fifth aspect, the example method further comprises generating, by the compiler, a third checksum of the compiled code. In further accordance with the fifth aspect, the example method further comprises providing, by the compiler, the third checksum to the code generator via a second secure channel. In further accordance with the fifth aspect, the example method further comprises generating, by the code generator, a fourth checksum of the compiled code. In further accordance with the fifth aspect, the example method further comprises selectively loading the compiled code, by the code generator, based at least in part on whether the third checksum and the fourth checksum are same. In further accordance with the fifth aspect, the third checksum and the fourth checksum being the same indicates that the compiled code is to be loaded. In further accordance with the fifth aspect, the third checksum and the fourth checksum being different indicates that the compiled code is not to be loaded. The fifth aspect of the example method may be implemented in combination with the first, second, third, and/or fourth aspect of the example method, though the example embodiments are not limited in this respect.

In an example of the fifth aspect of the example method, the example method further comprises providing, by the compiler, a designated algorithm that is used to generate the third checksum to the code generator via the second secure channel. In accordance with the fifth aspect, generating the fourth checksum comprises using, by the code generator, the designated algorithm that is received from the compiler to generate the fourth checksum.

In an implementation of this example, the compiler supports a plurality of algorithms for generating checksums. In accordance with this implementation, the example method further comprises selecting, by the compiler, the designated algorithm from the plurality of algorithms in accordance with a round-robin selection technique to be used to generate the third checksum.

In another implementation of this example, the compiler supports a plurality of algorithms for generating checksums. In accordance with this implementation, the example method further comprises randomly selecting, by the compiler, the designated algorithm from the plurality of algorithms to be used to generate the third checksum.

In another example of the fifth aspect of the example method, the example method further comprises choosing, by the code generator, an algorithm that is used by the compiler to generate the third checksum.

In yet another example of the fifth aspect of the example method, the example method further comprises creating, by the code generator, a process that runs the compiler. In accordance with this example, providing the first checksum comprises using, by the code generator, the process to provide the first checksum to the compiler via the first secure channel. In further accordance with this example, providing the third checksum comprises using, by the compiler, the process to provide the third checksum to the code generator via the second secure channel.

In still another example of the fifth aspect of the example method, providing the third checksum comprises providing, by the compiler, the third checksum to the code generator via at least one of (a) a command line output or (b) a shared memory.

In yet another example of the fifth aspect of the example method, providing the third checksum comprises providing, by the compiler, the third checksum to the code generator via at least one of (a) one or more named pipes or (b) one or more secure network connections.

An example computer program product comprises a computer-readable storage medium having instructions recorded thereon for enabling a processor-based system to provide security for code. The instructions comprise first instructions for enabling the processor-based system to cause a code generator to generate a first checksum of a file that includes source code generated. The instructions further comprise second instructions for enabling the processor-based system to cause the code generator to provide the first checksum to a compiler via a first secure channel. The instructions further comprise third instructions for enabling the processor-based system to cause the compiler to generate a second checksum of the file that includes the source code. The instructions further comprise fourth instructions for enabling the processor-based system to cause the compiler to selectively compile the source code based at least in part on whether the first checksum and the second checksum are same. The first checksum and the second checksum being the same indicates that the source code is to be compiled. The first checksum and the second checksum being different indicates that the source code is not to be compiled.

IV. Example Computer System

Figure 8:
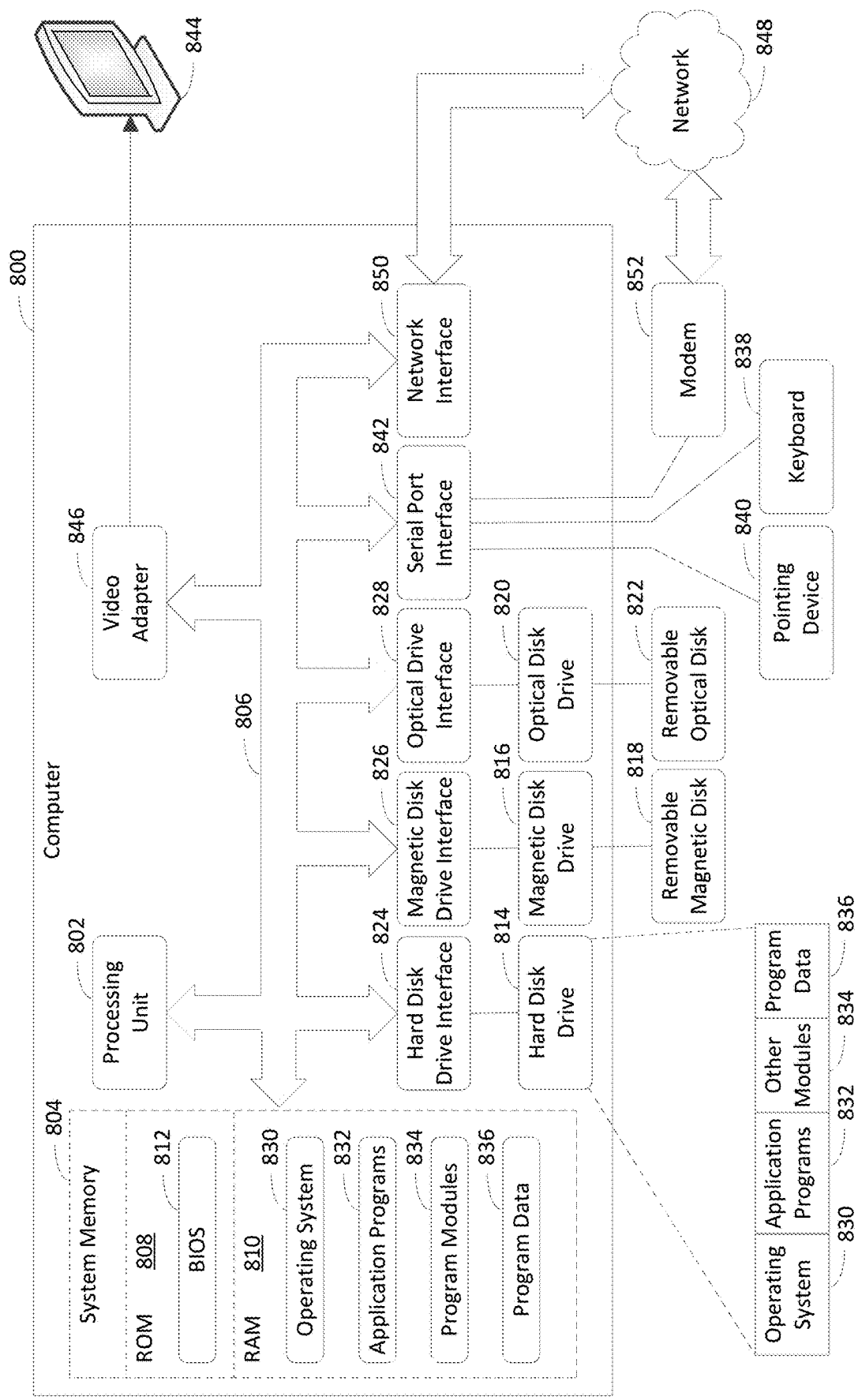
FIG. 8 depicts an example computer in which embodiments may be implemented.

FIG. 8 depicts an example computer 800 in which embodiments may be implemented. Computing system 100 shown in FIG. 1, any one or more of user systems 202A-202M and/or any one or more of servers 206A-206N shown in FIG. 2, and/or computing system 700 shown in FIG. 7 may be implemented using computer 800, including one or more features of computer 800 and/or alternative features. Computer 800 may be a general-purpose computing device in the form of a conventional personal computer, a mobile computer, or a workstation, for example, or computer 800 may be a special purpose computing device. The description of computer 800 provided herein is provided for purposes of illustration, and is not intended to be limiting. Embodiments may be implemented in further types of computer systems, as would be known to persons skilled in the relevant art(s).

As shown in FIG. 8, computer 800 includes a processing unit 802, a system memory 804, and a bus 806 that couples various system components including system memory 804 to processing unit 802. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computer 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, computer program logic for implementing any one or more of checksum-based code security module 104, code generator 106, compiler 110, client-side checksum-based code security module 204a, server-side checksum-based code security module 204b, checksum-based code security module 704, the code generator 706, the compiler 710, the code generation logic 730, the first checksum logic 732, the first provision logic 734, the compiler launcher 736, the selective loading logic 738, the second checksum logic 742, the second provision logic 744, the selective compilation logic 748, flowchart 300 (including any step of flowchart 300), flowchart 400 (including any step of flowchart 400), flowchart 500 (including any step of flowchart 500), and/or flowchart 600 (including any step of flowchart 600), as described herein.

A user may enter commands and information into the computer 800 through input devices such as keyboard 838 and pointing device 840. Other input devices (not shown) may include a microphone, joystick, game pad, satellite dish, scanner, touch screen, camera, accelerometer, gyroscope, or the like. These and other input devices are often connected to the processing unit 802 through a serial port interface 842 that is coupled to bus 806, but may be connected by other interfaces, such as a parallel port, game port, or a universal serial bus (USB).

A display device 844 (e.g., a monitor) is also connected to bus 806 via an interface, such as a video adapter 846. In addition to display device 844, computer 800 may include other peripheral output devices (not shown) such as speakers and printers.

Computer 800 is connected to a network 848 (e.g., the Internet) through a network interface or adapter 850, a modem 852, or other means for establishing communications over the network. Modem 852, which may be internal or external, is connected to bus 806 via serial port interface 842.

As used herein, the terms "computer program medium" and "computer-readable storage medium" are used to generally refer to media (e.g., non-transitory media) such as the hard disk associated with hard disk drive 814, removable magnetic disk 818, removable optical disk 822, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850 or serial port interface 842. Such computer programs, when executed or loaded by an application, enable computer 800 to implement features of embodiments discussed herein. Accordingly, such computer programs represent controllers of the computer 800.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A code security system comprising:
memory; and
one or more processors coupled to the memory, the one or more processors configured to execute a code generator and a compiler,
the code generator to generate source code, the code generator further to generate a first checksum of a file that includes the source code, the code generator further to provide the first checksum to the compiler via a first secure channel,
the compiler to generate a second checksum of the file that includes the source code, the compiler further to determine whether to compile the source code based at least in part on whether the first checksum and the second checksum are same,
the first checksum and the second checksum being the same indicating that the source code is to be compiled,
the first checksum and the second checksum being different indicating that the source code is not to be compiled.

2. The code security system of claim 1, wherein the code generator is further to provide a designated algorithm that is used to generate the first checksum to the compiler via the first secure channel; and
wherein the compiler is to use the designated algorithm that is received from the code generator to generate the second checksum.

3. The code security system of claim 2, wherein the code generator supports a plurality of algorithms for generating checksums; and
wherein the code generator is to randomly select the designated algorithm from the plurality of algorithms to be used to generate the first checksum.

4. The code security system of claim 2, wherein the code generator supports a plurality of algorithms for generating checksums;
wherein the code generator is to communicate with the compiler to determine which of the plurality of algorithms are supported by the compiler; and
wherein the code generator is to select the designated algorithm from a subset of the plurality of algorithms, which is indicated by the compiler to be supported by the compiler, to be used to generate the first checksum.

5. The code security system of claim 2, wherein the code generator supports a plurality of algorithms for generating checksums; and
wherein the code generator is to select the designated algorithm from the plurality of algorithms to be used to generate the first checksum based at least in part on an estimated cryptographic security associated with the designated algorithm being greater than an estimated cryptographic security associated with each of the other algorithms.

6. The code security system of claim 1, wherein the code generator is to create a process that runs the compiler, the code generator to use the process to provide the first checksum to the compiler via the first secure channel.

7. The code security system of claim 1, wherein the code generator is to provide the first checksum to the compiler via at least one of (a) one or more command line arguments, (b) one or more named pipes, (c) a shared memory, or (d) a secure network connection.

8. The code security system of claim 1, wherein the code generator is to generate a first keyed-hash message authentication code of the file that includes the source code using an RSA algorithm or a key exchange algorithm; and
wherein the compiler is to generate a second keyed-hash message authentication code of the file that includes the source code using the RSA algorithm or the key exchange algorithm, the compiler to determine whether to compile the source code based at least in part on whether the first keyed-hash message authentication code and the second keyed-hash message authentication code are same,
the first keyed-hash message authentication code and the second keyed-hash message authentication code being the same indicating that the source code is to be compiled,
the first keyed-hash message authentication code and the second keyed-hash message authentication code being different indicating that the source code is not to be compiled.

9. The code security system of claim 1, wherein compilation of the source code results in compiled code, the compiler further to generate a third checksum of the compiled code, the compiler further configured to provide the third checksum to the code generator via a second secure channel; and wherein the code generator is further to generate a fourth checksum of the compiled code, the code generator further to determine whether to load the compiled code based at least in part on whether the third checksum and the fourth checksum are same, the third checksum and the fourth checksum being the same indicating that the compiled code is to be loaded, the third checksum and the fourth checksum being different indicating that the compiled code is not to be loaded.

10. The code security system of claim 9, wherein the compiler is further to provide a designated algorithm that is used to generate the third checksum to the code generator via the second secure channel; and wherein the code generator is to use the designated algorithm that is received from the compiler to generate the fourth checksum.

11. The code security system of claim 9, wherein the code generator is to create a process that runs the compiler, the code generator to use the process to provide the first checksum to the compiler via the first secure channel; and wherein the compiler is to use the process to provide the third checksum to the code generator via the second secure channel.

12. The code security system of claim 9, wherein the compiler is to provide the third checksum to the code generator via at least one of (a) a command line output, (b) one or more named pipes, (c) a shared memory, or (d) a secure network connection.

13. A method of providing security for code comprising:
generating source code by a code generator;
generating, by the code generator, a first checksum of a file that includes the source code;
providing, by the code generator, the first checksum to a compiler via a first secure channel;
generating, by the compiler, a second checksum of the file that includes the source code; and
selectively compiling the source code, by the compiler, based at least in part on whether the first checksum and the second checksum are same,
the first checksum and the second checksum being the same indicating that the source code is to be compiled,
the first checksum and the second checksum being different indicating that the source code is not to be compiled.

14. The method of claim 13, further comprising:
providing, by the code generator, a designated algorithm that is used to generate the first checksum to the compiler via the first secure channel;
wherein generating the second checksum comprises:
using, by the compiler, the designated algorithm that is received from the code generator to generate the second checksum.

15. The method of claim 13, wherein selectively compiling the source code comprises:
compiling the source code, by the compiler, to provide compiled code in response to the first checksum and the second checksum being the same; and
wherein the method further comprises:
generating, by the compiler, a third checksum of the compiled code;
providing, by the compiler, the third checksum to the code generator via a second secure channel;
generating, by the code generator, a fourth checksum of the compiled code; and
selectively loading the compiled code, by the code generator, based at least in part on whether the third checksum and the fourth checksum are same,
the third checksum and the fourth checksum being the same indicating that the compiled code is to be loaded,
the third checksum and the fourth checksum being different indicating that the compiled code is not to be loaded.

16. The method of claim 15, further comprising:
providing, by the compiler, a designated algorithm that is used to generate the third checksum to the code generator via the second secure channel;
wherein generating the fourth checksum comprises:
using, by the code generator, the designated algorithm that is received from the compiler to generate the fourth checksum.

17. The method of claim 16, wherein the compiler supports a plurality of algorithms for generating checksums; and
wherein the method further comprises:
selecting, by the compiler, the designated algorithm from the plurality of algorithms in accordance with a round-robin selection technique to be used to generate the third checksum.

18. The method of claim 16, wherein the compiler supports a plurality of algorithms for generating checksums; and
wherein the method further comprises:
randomly selecting, by the compiler, the designated algorithm from the plurality of algorithms to be used to generate the third checksum.

19. The method of claim 15, further comprising:
creating, by the code generator, a process that runs the compiler;
wherein providing the first checksum comprises:
using, by the code generator, the process to provide the first checksum to the compiler via the first secure channel; and
wherein providing the third checksum comprises:
using, by the compiler, the process to provide the third checksum to the code generator via the second secure channel.

20. A computer program product comprising a computer-readable storage device having instructions recorded thereon for enabling a processor-based system to perform operations to provide security for code, the operations comprising:
cause a code generator to generate a first checksum of a file that includes source code generated;
cause the code generator to provide the first checksum to a compiler via a first secure channel;
cause the compiler to generate a second checksum of the file that includes the source code; and
cause the compiler to selectively compile the source code based at least in part on whether the first checksum and the second checksum are same,
the first checksum and the second checksum being the same indicating that the source code is to be compiled,
the first checksum and the second checksum being different indicating that the source code is not to be compiled.

* * * * *